(12) United States Patent
Mauceri et al.

(10) Patent No.: US 7,837,182 B2
(45) Date of Patent: Nov. 23, 2010

(54) DUST BOOT RETENTION SYSTEM

(75) Inventors: David A. Mauceri, Londonderry, NH (US); Robert S. Feldmann, Londonderry, NH (US)

(73) Assignee: Vibracoustic North America, L.P., Plymouth, MI (US)

( * ) Notice: Subject to any disclaimer, the term of this patent is extended or adjusted under 35 U.S.C. 154(b) by 911 days.

(21) Appl. No.: 11/691,144

(22) Filed: Mar. 26, 2007

(65) Prior Publication Data

US 2008/0237999 A1 Oct. 2, 2008

(51) Int. Cl.
 *F16M 1/00* (2006.01)
(52) U.S. Cl. ............... 267/139; 188/322.12; 267/140; 267/219; 267/220
(58) Field of Classification Search ............ 267/139, 267/140, 219, 220; 188/322.12; 277/634, 277/637
See application file for complete search history.

(56) References Cited

U.S. PATENT DOCUMENTS

| | | | | |
|---|---|---|---|---|
| 2,163,255 A | * | 6/1939 | Klein et al. ............ | 188/322.12 |
| 3,901,518 A | * | 8/1975 | Uchida .................. | 277/635 |
| 4,415,146 A | | 11/1983 | Sitko | |
| 5,158,269 A | * | 10/1992 | Hein et al. ............. | 267/220 |
| 5,172,999 A | * | 12/1992 | Ijima et al. ............ | 403/51 |
| 5,466,084 A | * | 11/1995 | Brueggen et al. ...... | 403/134 |
| 5,467,970 A | * | 11/1995 | Ratu et al. ............. | 267/220 |
| 5,788,262 A | * | 8/1998 | Dazy et al. ............ | 280/124.155 |
| 7,244,074 B2 | * | 7/2007 | Abels et al. ........... | 403/51 |
| 7,281,705 B2 | * | 10/2007 | Huprikar ................ | 267/220 |
| 7,416,175 B2 | * | 8/2008 | Al-Dahhan ............. | 267/220 |
| 2001/0015537 A1 | * | 8/2001 | De Fontenay et al. .. | 280/124.155 |
| 2006/0279031 A1 | * | 12/2006 | Schleck et al. ......... | 267/220 |
| 2007/0267793 A1 | * | 11/2007 | Chamousset et al. ... | 267/220 |

\* cited by examiner

*Primary Examiner*—Robert A Siconolfi
*Assistant Examiner*—James K Hsiao
(74) *Attorney, Agent, or Firm*—Ronald W. Wangerow; Harness, Dickey & Pierce, P.L.C.

(57) ABSTRACT

A dust boot retention system includes a jounce bumper having an end portion with an outer diameter and an annular recessed groove adjacent to the end portion. A dust boot is attached to the jounce bumper and has an upper flange including a radially inwardly extending portion and an axially extending portion extending from an innermost portion of the radially inwardly extending portion. The axially extending portion has an inner diameter smaller than the outer diameter of the end portion of the jounce bumper. A rate ring secures the dust boot to the jounce bumper. The rate ring includes an inner diameter smaller than the outer diameter of the end portion of the jounce bumper. The rate ring includes an annular recessed channel in a first end thereof for receiving the axially extending portion of the dust boot. The rate ring and the upper flange are press fit over the end portion of the jounce bumper whereby the rate ring is received in the annular recessed groove and secures the end portion of the dust boot to the jounce bumper.

6 Claims, 3 Drawing Sheets

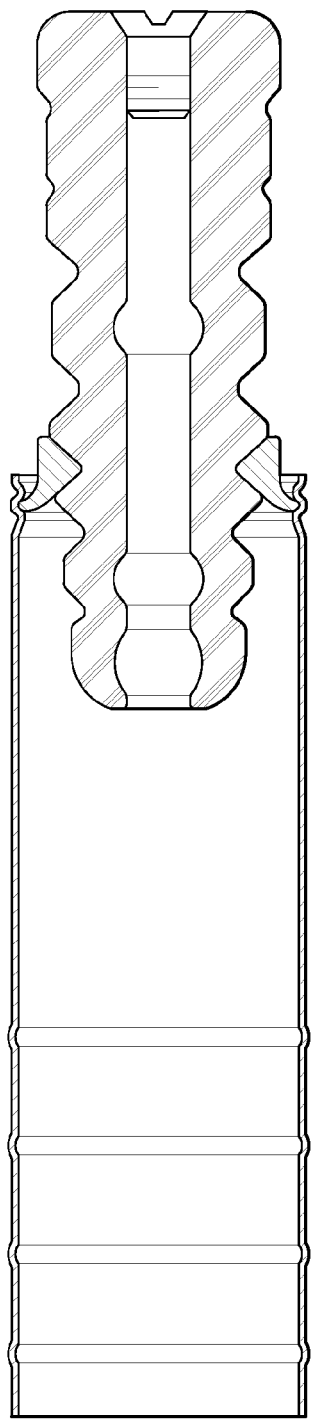
Fig-3
_PRIOR ART_
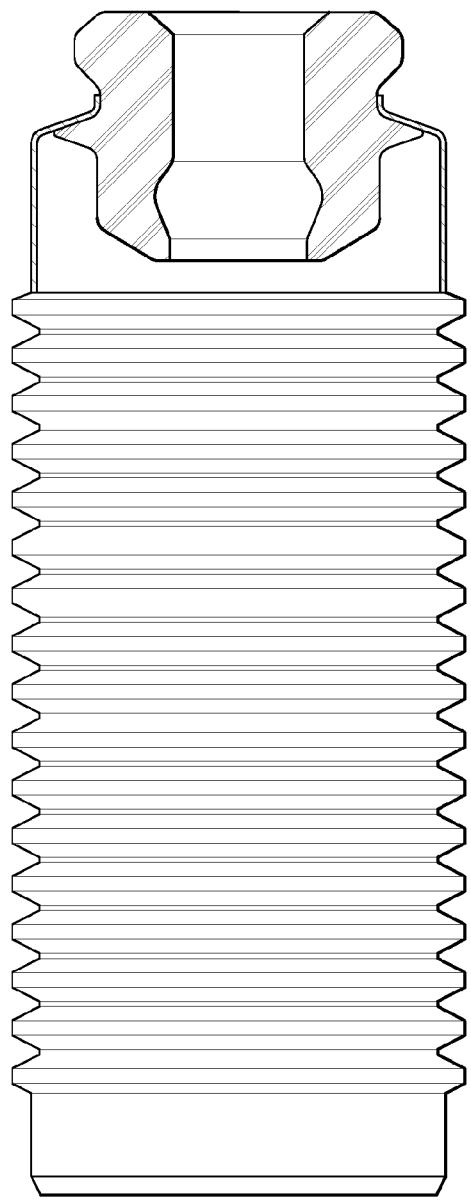
Fig-4
_PRIOR ART_

DUST BOOT RETENTION SYSTEM

FIELD

The present disclosure relates to vehicle suspension systems and more particularly to a retention system for mounting a dust boot to a jounce bumper of a vehicle suspension system.

BACKGROUND

The statements in this section merely provide background information related to the present disclosure and may not constitute prior art.

Dust boot assemblies are commonly utilized in vehicle suspension systems to shield and protect shock absorber components from dust and debris. Existing designs attach the dust boot to the outside of a rate ring, as illustrated in FIG. 3. As compared to the design of the present disclosure, the design of FIG. 3 requires an additional assembly operation, requires more packaging space for the dust boot, has the potential for the dust boot to come loose from the jounce bumper, and requires tight tolerances on the rate ring and dust boot interface.

As an alternative, dust boots have been attached directly to the jounce bumper, as illustrated in FIG. 4. As compared to the design of the present disclosure, the design of FIG. 4 also requires more packaging space for the dust boot, has the potential for the dust boot to come loose from the jounce bumper and requires tight tolerances on the jounce bumper and dust boot interface.

As yet another alternative, dust boots have been pressed directly into the upper shock mount, as illustrated in FIG. 5. As compared to the design of the present disclosure, the design of FIG. 5 also requires an additional assembly operation at the final assembly location and requires more packaging space for the dust boot.

Accordingly, it is desirable in the art to provide a dust boot retention system which requires fewer assembly steps, eliminates the risk of the dust boot coming loose from the jounce bumper, eliminates the need for the customer to assemble the dust boot, and reduces the overall package size of the assembly.

SUMMARY

The present disclosure provides a dust boot retention system for a vehicle suspension system including a jounce bumper having an end portion with an outer diameter and an annular recessed groove adjacent to the end portion. A dust boot is attached to the jounce bumper and has an upper flange including a radially inwardly extending portion and an axially extending portion extending from an innermost portion of the radially inwardly extending portion. The axially extending portion has an inner diameter smaller than the outer diameter of the end portion of the jounce bumper. A rate ring secures the dust boot to the jounce bumper. The rate ring includes an inner diameter smaller than the outer diameter of the end portion of the jounce bumper. The rate ring includes an annular recessed channel in a first end thereof for receiving the axially extending portion of the dust boot. The rate ring and the upper flange are press fit over the end portion of the jounce bumper whereby the rate ring is received in the annular recessed groove and secures the end portion of the dust boot to the jounce bumper.

The dust boot retention system according to the present disclosure requires fewer assembly steps, eliminates the risk of the dust boot coming loose from the jounce bumper, eliminates the need for the customer to assemble the dust boot, and reduces the overall package size of the assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a cross-sectional view of a prior art dust boot retention system with a dust boot attached to an outside of a rate ring;

FIG. 4 is a cross-sectional view of a second prior art dust boot retention system with a dust boot attached directly to a jounce bumper.

DETAILED DESCRIPTION

The following description is merely exemplary in nature and is not intended to limit the present disclosure, application, or uses.

Figure 1:
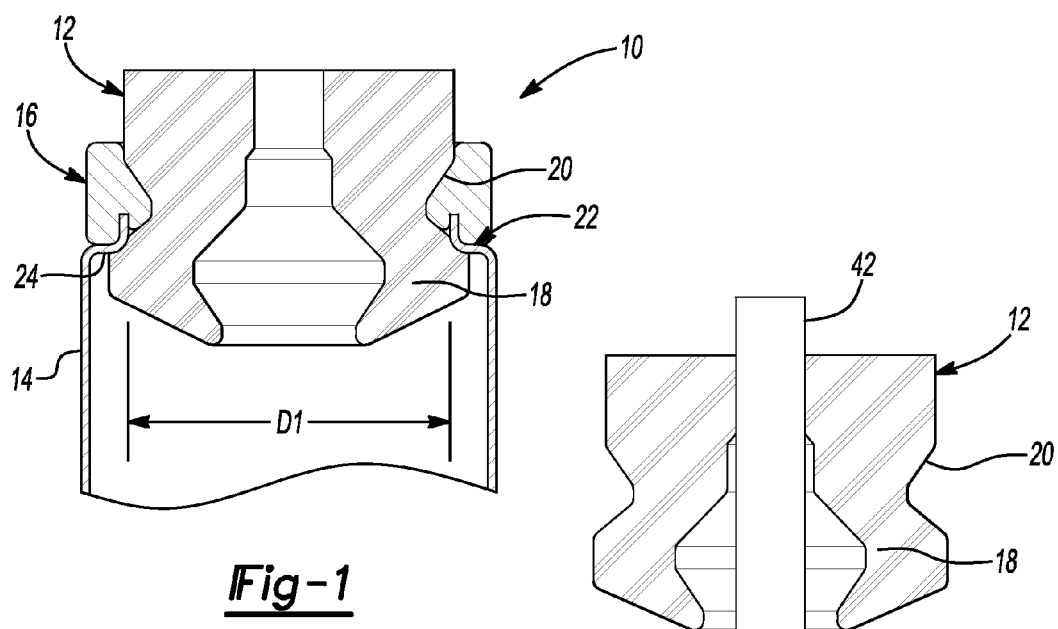
FIG. 1 is a cross-sectional view of the dust boot retention system according to the principles of the present disclosure.
Figure 2:
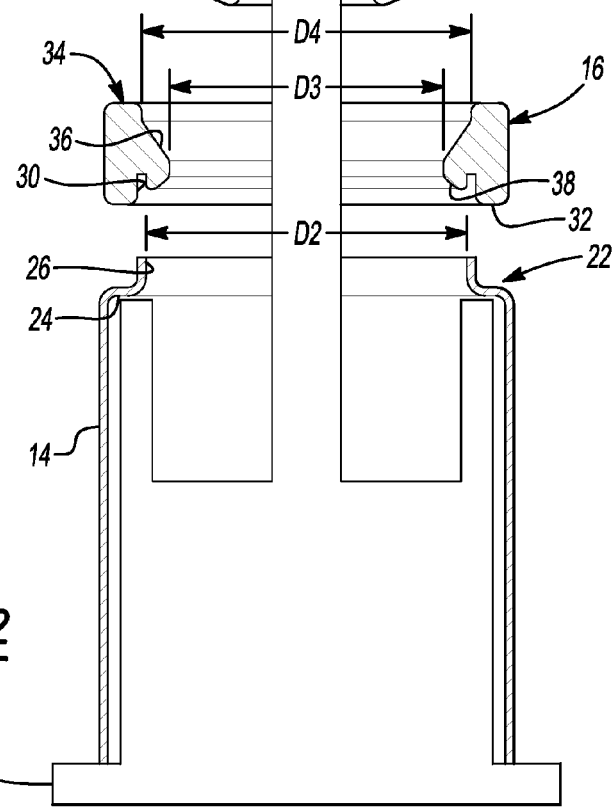
FIG. 2 is an exploded cross-sectional view illustrating the assembly of the dust boot retention system according to the principles of the present disclosure.
Figure 5:
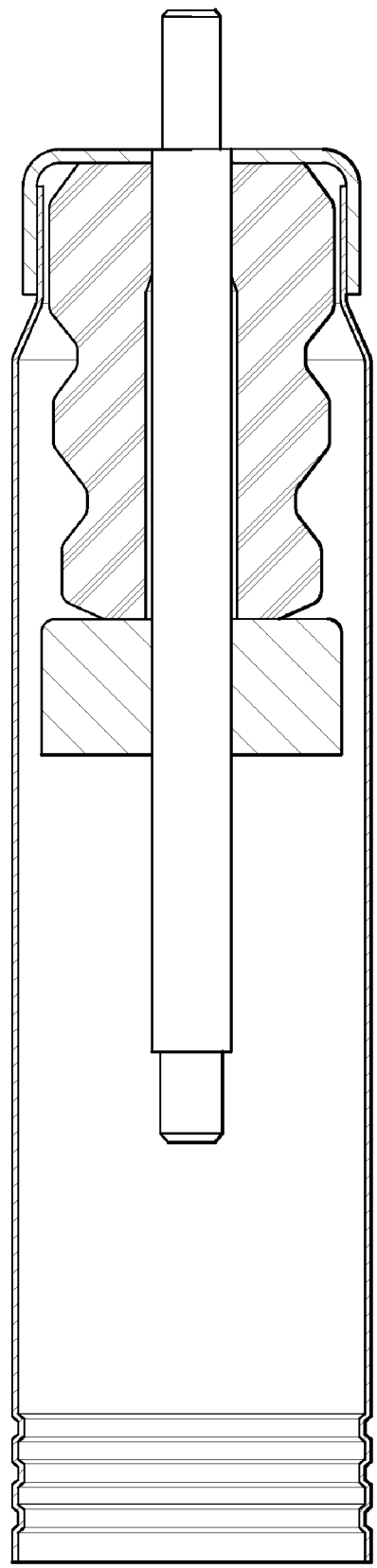
FIG. 5 is a cross-sectional view of a third prior art dust boot retention system with a dust boot pressed into an upper shock mount.

With reference to FIGS. 1 and 2, the dust boot retention system 10 according to the principles of the present disclosure will now be described.

The dust boot retention system 10 includes a jounce bumper 12, a dust boot 14 and a rate ring 16 which secures the dust boot 14 to the jounce bumper 12. The jounce bumper 12 has an end portion 18 with an outer diameter D1 and an annular recessed groove 20 disposed adjacent to the end portion 18. The jounce bumper 12 can be made from elastomeric material such as microcellular polyurethane foam, rubber, or polyurethane.

The dust boot 14 is generally cylindrical in shape, and can include a plurality of accordion-like folds. The dust boot 14 includes an upper flange 22 including a radially inwardly extending portion 24 and an axially extending portion 26 extending from an innermost portion of the radially inwardly extending portion 24. The axially extending portion 26 has an inner diameter D2 which is smaller than the outside diameter D1 of the end portion 18 of the jounce bumper 12.

The rate ring 16 assists the jounce bumper in providing the desired spring rate and has the additional function of securing the dust boot 14 to the jounce bumper 12. The rate ring 16 includes an inner diameter D3 that is smaller than the outer diameter D1 of the end portion 18 of the jounce bumper 12. The rate ring includes an annular, axially extending, recessed channel 30 in a first end 32 of the rate ring 16. The annular recessed channel 30 is adapted to receive the axially extending portion 26 of the upper flange 22 of the dust boot 14. The rate ring 16 includes a second end 34 having an inner diameter D4 which is equal to or larger than the outer diameter D1 of the end portion 18 of the jounce bumper 12. The rate ring 16 further includes a radially inwardly extending ramped portion 36 adjacent to the second end 34 and having a peak portion with the inner diameter being equal to D3. The ramped portion 36 preferably has an angle relative to an axis of the rate ring 16 that is smaller than 40 degrees and more particularly approximately 30 degrees. The rate ring 16 further includes a locking surface 38 that extends radially inward from, and adjacent to, the inwardly recessed groove 30. The locking surface 38 terminates at the peak portion of the ramped portion 36. The locking surface 38 is angled relative to an axis of the rate ring at an angle greater than 40 degrees and preferably approximately 45 degrees.

During assembly, the dust boot 14 and rate ring 16 are inserted over an assembly fixture 40 with the axially extending portion 26 of flange 22 received in recessed channel 30, as illustrated in FIG. 2. The jounce bumper 12 is then slid onto the fixture rod 42 and pressed into the rate ring 16 and dust boot 14 so as to deform radially inwardly. In the final assembly as illustrated in FIG. 1, the dust boot upper flange 22 is retained on the jounce bumper 12 by the rate ring 16 which captures the flange 22 between the end portion 18 of the jounce bumper 12 and within the recessed channel 30.

The dust boot retention system 10 of the present disclosure eliminates an assembly operation as compared to the previous dust boot systems. Furthermore, the system of the present disclosure eliminates the risk of the dust boot 14 coming loose from the jounce bumper 12, eliminates the need for the customer to assemble the dust boot 14 and reduces the overall package size of the assembly since the dust boot outside diameter can be the same or less than the outside diameter of the rate ring 16.

What is claimed is:

1. A dust boot retention system, comprising:
   a jounce bumper having an end portion with an outer diameter and an annular recessed groove adjacent to said end portion;
   a dust boot attached to said jounce bumper, said dust boot having an upper flange including a radially inwardly extending portion and an axially extending portion extending from an innermost portion of said radially inwardly extending portion, said axially extending portion having an inner diameter smaller than said outer diameter of said end portion of said jounce bumper; and
   a rate ring securing said dust boot to said jounce bumper, said rate ring including an inner diameter smaller than said outer diameter of said end portion of said jounce bumper, said rate ring including an annular recessed channel in a first end thereof for receiving said axially extending portion of said dust boot, said rate ring and said upper flange being press fit over said end portion of said jounce bumper whereby said rate ring is received in said annular recessed groove and secures said end portion of said dust boot to said jounce bumper.

2. The dust boot retention system according to claim 1, wherein said rate ring includes a second end having an inner diameter larger than said outer diameter of said end portion of said jounce bumper.

3. The dust boot retention system according to claim 2, wherein said rate ring further includes a radially inwardly extending ramped portion adjacent to said second end and having a peak portion having an inner diameter smaller than said outer diameter of said end portion of said jounce bumper.

4. The dust boot retention system according to claim 3, wherein said ramped portion has an angle smaller than 40 degrees relative to an axis of said rate ring.

5. The dust boot retention system according to claim 1, wherein said rate ring further includes a locking surface radially inward and adjacent to said annular recessed groove.

6. The dust boot retention system according to claim 5, wherein said locking surface is angled relative to an axis of said rate ring at an angle greater than 40 degrees.

* * * * *